United States Patent
Templier et al.

(12)

(10) Patent No.: US 8,334,818 B2
(45) Date of Patent: Dec. 18, 2012

(54) DISPLAY UNIT, METHOD OF DISPLAY AND RECORDING MEDIUM FOR THIS METHOD

(75) Inventors: Francois Templier, Voiron (FR); Thimothee Jobert, Grenoble (FR); Edouard Siekierski, Paris (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 364 days.

(21) Appl. No.: 12/821,229

(22) Filed: Jun. 23, 2010

(65) Prior Publication Data

US 2010/0321276 A1    Dec. 23, 2010

(30) Foreign Application Priority Data

Jun. 23, 2009  (FR) ..................................... 09 54267

(51) Int. Cl.
*G09G 5/00*        (2006.01)

(52) U.S. Cl. .......................................... 345/1.3; 345/1.1
(58) Field of Classification Search .................. None
See application file for complete search history.

(56) References Cited

U.S. PATENT DOCUMENTS

| 7,362,046 B2 * | 4/2008 | Aston ........................... 313/498 |
| 2009/0051830 A1 * | 2/2009 | Matsushita et al. ........... 348/836 |

* cited by examiner

*Primary Examiner* — Muhammad N Edun
(74) *Attorney, Agent, or Firm* — Occhiuti Rohlicek & Tsao LLP

(57) ABSTRACT

This display unit comprises screens (4, 6, 8, 10) positioned in parallel to a plane of display between a retracted position in which at least two screens overlap to reduce a cumulated display surface and a fully deployed position in which the overlapping of the screens is reduced or eliminated to increase the cumulated display surface, and a computer (12) capable of commanding the display of a complete image on the totality of the cumulated display surface both in the retracted position and in the fully deployed position.

9 Claims, 2 Drawing Sheets

DISPLAY UNIT, METHOD OF DISPLAY AND RECORDING MEDIUM FOR THIS METHOD

CROSS-REFERENCE TO RELATED APPLICATIONS

This application claims the benefit of the priority date of French Application No. 0954267, filed on Jun. 23, 2009, the contents of which are hereby incorporated by reference in its entirety.

FIELD OF THE INVENTION

The invention pertains to a display unit and to a method of display by means of this display unit. The method also pertains to an information-recording medium for implementing this method of display.

BACKGROUND OF THE INVENTION

The present filing party knows display units comprising:
several screens positioned in parallel to a same plane of display so as to form a cumulated surface of display of an image equal to the accumulated total of the individual display surfaces of each screen minus overlapping surfaces, if any, between the individual display surfaces, and
a computer capable of commanding the display of image portions on respective screens so as to display the complete image on the totality of the cumulated display surface.

In the known display units, the screens are fixed to one another without any degree of freedom. More specifically, they are positioned beside one another so that their individual display surfaces do not overlap.

These display units are used to obtain a great total display surface using several individual display surfaces. However, such display units are very bulky. Thus, it is very difficult to use them in mobile terminals.

SUMMARY OF THE INVENTION

The invention seeks to overcome this drawback.

An object of the invention therefore is a display unit wherein:
the screens can be shifted in parallel to the plane of display between a retracted position in which at least two screens overlap to reduce the cumulated display surface and a fully deployed position in which the overlapping of the screens is reduced or eliminated to increase the cumulated display surface, and
the computer is capable of commanding a display of a complete image on the totality of the cumulated display surface both in the retracted position and in the fully deployed position.

The possibility of shifting the screens towards the retracted position reduces the space requirement of the display unit. This may be useful during a shifting of this display unit.

Conversely, the possibility of shifting the screens towards the deployed position gives a greater cumulated display surface which can be exploited during its use.

The embodiments of this display unit may comprise one or more of the following characteristics:
the display unit comprises at least one sensor capable of measuring the position of the screens and the computer is capable of automatically adapting the display of the image to the measured position of the screens;
the computer is capable of commanding the display of the same complete image on the totality of the cumulated display surface both in the retracted position and in the fully deployed position;
the display unit comprises at least three screens that can be shifted relative to one another and a synchronization mechanism capable of imposing a correlation between the shifts of these screens;
the display unit comprises a mechanism for locking the positions of the screens in at least one intermediate position between the retracted position and the fully deployed position.

These embodiments of the display unit furthermore have the following advantages:
the use of a sensor of the position of the screens makes it possible to automatically adapt the display of the image and therefore simplifies the use of this display unit;
the display of the same image on a cumulated display surface of varying size provides the user with a new way to magnify an image by magnifying the cumulated display surface;
the use of a synchronization mechanism makes it possible to comply with, for example, a predetermined ratio between the width and the height of the cumulated display surface;
the use of a mechanism for locking intermediate positions enables an easier adaptation of the cumulated display surface to the user's wishes.

An object of the invention is also a method for displaying an image on the above display unit, this method comprising:
the control of the display of a complete image on the totality of the cumulated display surface both in the retracted position and in the fully deployed position.

The embodiments of this method of display may comprise the following characteristics:
the method comprises:
the measuring of the position of the screens,
the detecting of a shifting of the screens from the measured position of the screens, and
in response, the automatic activation of a new command for displaying each image portion;
the method comprises the commanding of the display of the same complete image on the totality of the cumulated display surface both in the retracted position and in the fully deployed position.

These embodiments of the method of display furthermore have the following advantage:
the detection of a shift of the screens gives an image that automatically adapts to the new cumulated display surface obtained.

Finally, an object of the invention is an information-recording medium comprising instructions for implementing the above method of display when these instructions are executed by an electronic computer.

BRIEF DESCRIPTION OF THE DRAWINGS

The invention will be understood more clearly from the following description given purely by way of an example and made with reference to the appended drawings of which.

In these figures, the same references are used to designate the same elements.

DETAILED DESCRIPTION

Here below in this description, the characteristics and functions well known to those skilled in the art are not described in detail.

Figure 1:
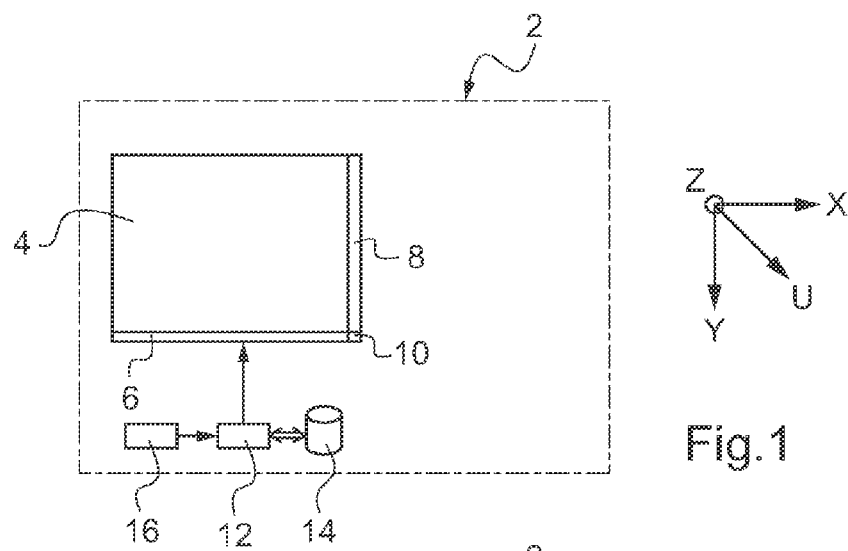
FIGS. 1 to 3 represent a display unit equipped with several screens in three different positions.

FIG. 1 represents a display unit 2 equipped with four screens 4, 6, 8 and 10 that can be shifted relatively to one another parallel to a display plane. Here, the display plane is defined by a horizontal direction X and a vertical direction Y orthogonal to the direction X. In FIG. 1, the screens 4, 6, 8 and 10 are represented in a retracted position. In this retracted position, the individual display surfaces of each of these screens overlap one another almost completely. For example, at least 90% of the individual display surface of each screen 6, 8 and 10 is concealed when it is observed along the direction Z. The individual display surface of a screen is the maximum surface of the screen on which an image can be displayed. These individual surfaces extend in parallel to the display plane.

Each of the screens 4, 6, 8 and 10 is a flat screen. Preferably, these flat screens are as thin as possible. For example, the thickness of each screen in a direction Z perpendicular to the directions X and Y is less than $\frac{1}{10}^{th}$ of the length of the diagonal of this screen. Preferably, the thickness of each screen is less than 5 cm or 2 cm and, even more preferably, less than 5 mm or 3 mm. To this end, the screens 4, 6, 8 and 10 are for example OLED (Organic Light-Emitting Diode) screens.

These screens 4, 6, 8 and 10 are positioned relative to one another so as to create a cumulated display surface equal to the accumulated total of the individual display surfaces of each of these screens minus the overlapping surfaces between the individual display surfaces.

In order that the individual display surfaces may overlap, each of the screens 4, 6, 8 and 10 is positioned in a respective plane of shift parallel to the display plane. These planes of shift are stacked one behind the other in the direction Z.

Here, the screen 4 is the screen positioned in the most forward position in the direction Z. The screen is fixed relative to a frame of the display unit 2.

The respective planes of shift of the screens 6, 8 and 10 for their part are situated behind the screen 4 along the direction Z. For example, the screens 4, 6, 8 and 10 are stacked along the direction Z in the following order: screen 4, screen 6, screen 8 and screen 10.

In this embodiment, the screens 6 and 8 can be shifted only in translation respectively along the directions Y and X. The screen 10 can be shifted only in translation in its plane of shift along a direction U forming an angle of 45° with the directions X and Y.

The display unit 2 also has a programmable electronic computer 12 connected to each of the screens 4, 6, 8 and 10. This computer 12 is capable of subdividing a complete image to be displayed into several image portions and of commanding the display of each of these portions on one of the screens 4, 6, 8 and 10. Here, more specifically, the computer 12 is capable of implementing the method of FIG. 6. To this end, the computer 12 is connected to a memory 14 comprising the instructions needed to implement the method of FIG. 6 when they are executed by the computer 12.

The computer 12 is also connected to a sensor 6 of the positions of the screens 6, 8 and 10 respectively along the directions X, Y and U.

Figure 2:
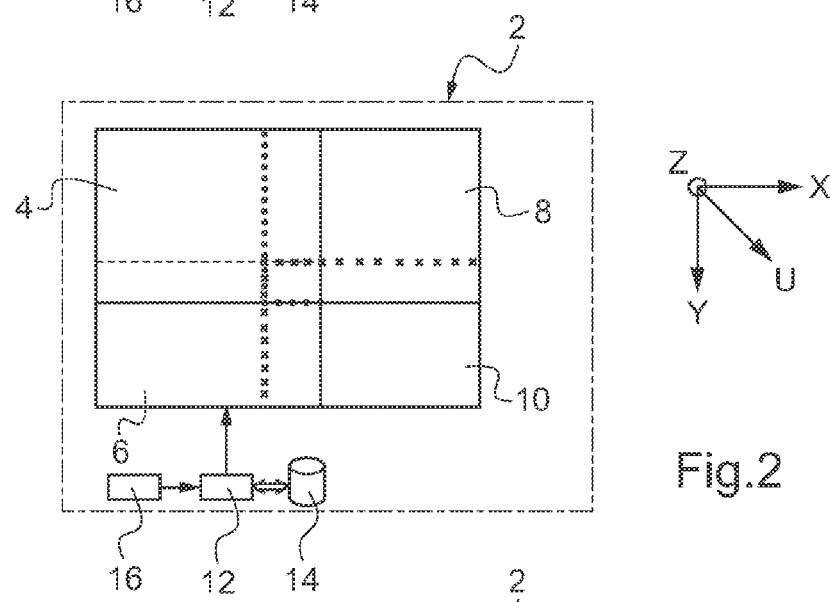
Figure 3:
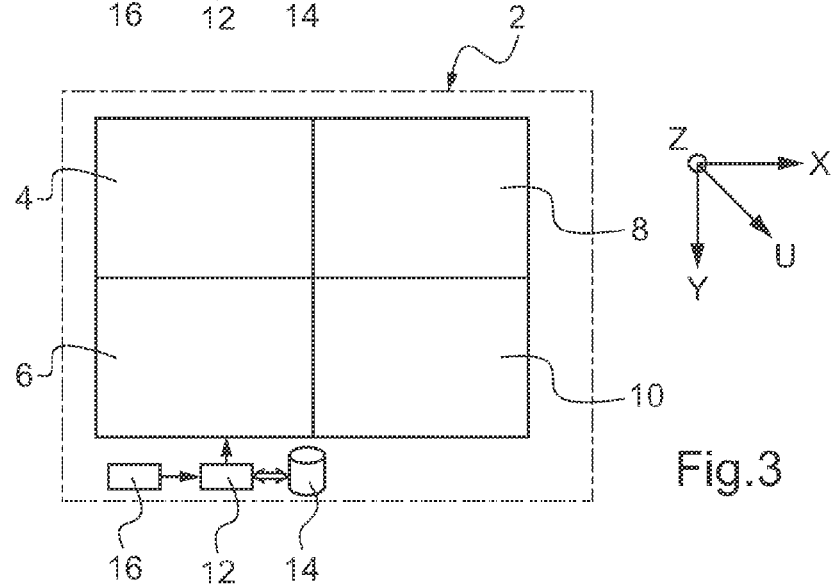

FIG. 2 represents the display unit 2 in a state in which the screens 4, 6, 8 and 10 are in an intermediate position between the retracted position represented in FIG. 1 and a fully deployed position represented in FIG. 3. In this intermediate position, the individual display surfaces of the screens 4, 6, 8 and 10 partially overlap when they are observed along the direction Z. However, the overlapping surfaces are smaller than they are in the retracted position.

In this FIG. 2, the contour of the individual display surface of the screen 6 which is located beneath the screen 4 is represented by a broken line. The contour of the individual display surface of the screen 8 which is beneath the screens 4 and 6 is represented by a line defined by a succession of dots. Finally, the contour of the screen 10 which is beneath the screens 4, 6 and 8 is represented by a line defined by a succession of crosses.

FIG. 3 represents the display unit 2 in a state in which the screens are in their fully deployed position. In this fully deployed position, their individual display surfaces do not overlap one another and are contiguous with one another when they are observed along the direction Z.

Here, the screens 4, 6, 8 and 10 are all identical.

Figure 4:
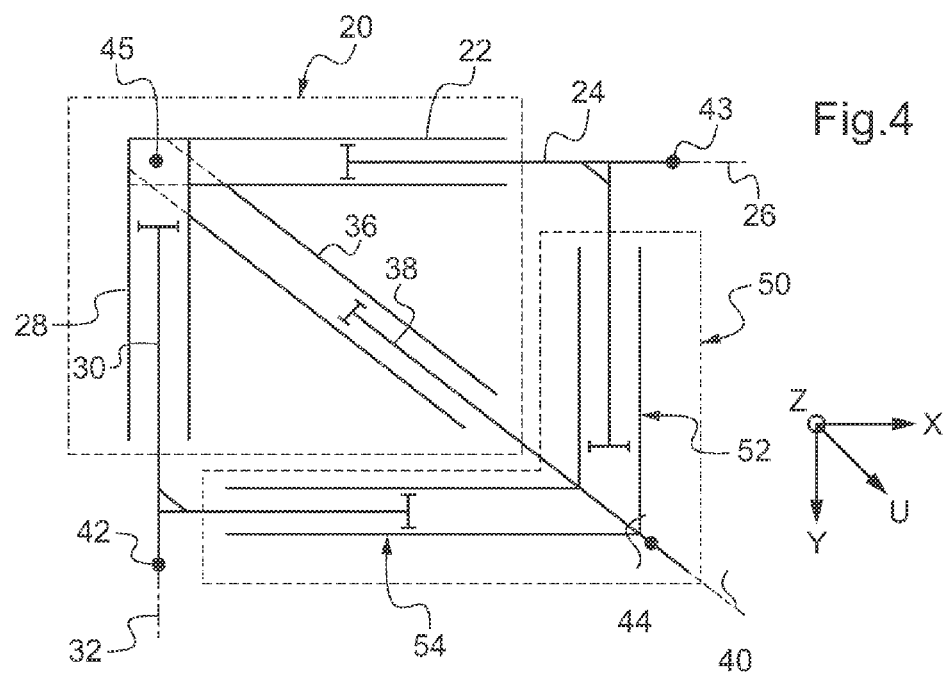
FIG. 4 is a schematic illustration of a shifting mechanism and a mechanism for synchronizing the shifts of the screens of the display unit of FIGS. 1 to 3.

FIG. 4 represents a possible example of a mechanism 20 for shifting the screens 6, 8 and 10 respectively along the directions X, Y and U. In this embodiment, the mechanism 20 is made out of slide-rails and sliders. More specifically, the mechanism 20 comprises:

a slide-rail 22 within which there slides a slider 24 along an axis 26 parallel to the direction X, a slide-rail 28 within which there slides a slider 30 along an axis 32 parallel to the direction Y, and a slide-rail 36 within which there slides a slider 38 along an axis 40 parallel to the direction U.

The slide-rails 22, 28 and 36 are attached without any degree of freedom to the frame of the display unit 2. The slide-rails 22, 28 and 36 are each positioned respectively in the planes of shift of the screens 6, 8 and 10.

The screens 6, 8 and 10 are attached without any degree of freedom to the free ends 42 to 44 respectively of the sliders 30, 24 and 38.

FIG. 4 also shows by way of illustration an attachment point 45 for attaching the screen 4 to the frame of the display unit 2.

FIG. 4 also shows a mechanism 50 for synchronizing the shifts of the screens 6, 8 and 10 relative to one another. Here, this mechanism 50 makes the shifting of the screens 6, 8 and 10 interdependent or correlates this shift along the directions X, Y and U. For example, the mechanism 50 is designed so that the ratio of the width to the height of the cumulated display surface is constant whatever the position of the screens 6, 8 and 10.

By way of an illustration, the mechanism 50 consists of a vertical rail 52 which extends vertically along the direction Y between the ends 43 and 44. The mechanism 50 also includes a horizontal rail 54 which extends along the direction X between the ends 42 and 44. These rails 52 and 54 are fixed to the free ends 42 to 44 so as not to hinder the shifts of the screens 6, 8 and 10 in their respective plane of movement. For example, the rails 52 and 54 are situated on or beyond the periphery of the screens 6, 8 and 10.

These rails 52 and 54 are rigid enough for the tensile force created when the end 44 is pulled in the direction U to also drive a shifting of the sliders 24 and 30 respectively along the directions X and Y. These rails are for example also formed by a means of respective slide-rails and sliders.

Figure 5:
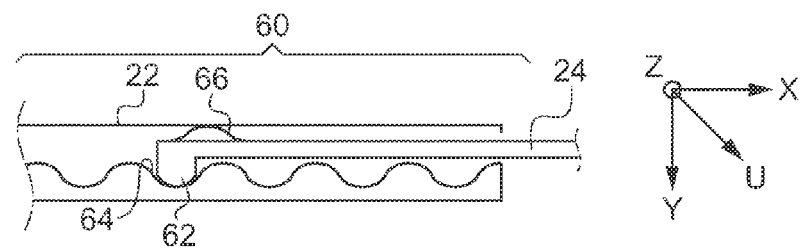
FIG. 5 is a schematic illustration of a method for locking the position of the screens of the display unit of FIGS. 1 to 3.

FIG. 5 represents a mechanism for locking the position of the screens. This mechanism 60 locks the translation of the screens 6, 8 and 10 to maintain them in the retracted position, or in the fully deployed position as well as in several intermediate positions such as those shown in FIG. 2.

For example, the mechanism 60 comprises a boss 62 fixedly joined to the end of the slider 24 situated within the slide-rail 22. This boss cooperates with a trough 64 fixedly joined to the slide-rail 22 to lock a position of the screen 8. The boss 62 here is acted upon within the trough 64 by a spring-blade 66. A succession of troughs is provided along the direction X so as to lock several intermediate positions between the retracted position and the fully deployed position.

A locking mechanism such as a mechanism 60 can also be provided for along the directions U and Y to lock the position of the screens 10 and 6. However, in the present case, this is not necessary since a locking of the position of the screen 8 also leads to the locking of the position of the screens 6 and 10 by means of the shift-synchronizing mechanism 50.

Figure 6:
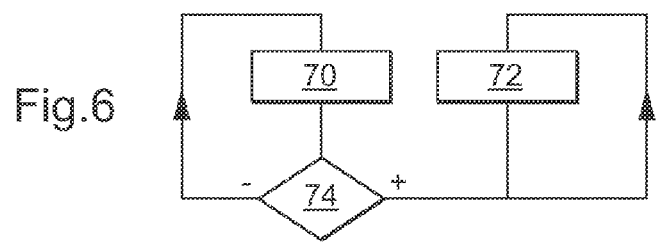
FIG. 6 is a flowchart of a method for displaying a complete image on the screens by means of the display unit of the FIGS. 1 to 3.

The operation of the display unit 2 shall now be described in greater detail with reference to the method of FIG. 6.

It is assumed here that the screens are initially in the retracted position shown in FIG. 1.

These screens may be shifted by the user from the retracted position to the fully deployed position. For example, to this end, the user pulls in the direction U on the screen 10 in order to drive a synchronized shift of the screens 6, 8 and 10 respectively along the directions X, Y and U.

At a step 70, the sensor 16 measures the position of at least one of the screens 6, 8 or 10 at each instant. This position is transmitted in real time to the computer 12.

At the same time, at a step 72, a computer 12 subdivides the complete image to be displayed into as many image portions as there are screens. This subdivision is done in such a way that, when each of the image portions is displayed on this respective screen, then the complete image is displayed on the totality of the cumulated display surface, i.e. on more than 90% and at most 100% of the cumulated display surface. At the step 72, the subdivision of the complete image into image portions is done as a function of the measured position of the screens and of the known size of the individual display surfaces of each screen.

By way of an illustration, the subdivision of the complete image consists firstly in determining the number of pixels available in the directions X and Y from the position of the screens. The available pixels are those that are not concealed by a screen situated in front, in the direction of observation Z. The total number of available pixels increases with the shifting of the screens to the fully deployed position. It varies in a proportion of one (when all the screens are superimposed) to four (with the maximum extension). For each position, the computer determines the best subdivision of the complete image to be displayed relative to the number of pixels available in this position. Two or more available pixels of the screen may serve to display the same point of the source image. This computation is compliant with that performed by those skilled in the art who must display a given source image on screens of variable definition (i.e. screens having variable numbers of pixels along the directions X and/or Y) or else that must display source images of variable resolution on a screen of given resolution.

Once the subdivision has been done, at the step 72, the computer 12 commands the display of each of these image portions on its respective screens so as to display the complete image on the totality of the cumulated display surface.

The step 72 is reiterated for each new image to be displayed.

At a step 74, the computer 12 uses the measured positions of screens to detect the shift of these screens. For example, the computer 12 compares the new measured position with a previously measured position. Should no shift be detected, the method returns to the step 70.

If not, at the step 72, the computer automatically adapts the size of the currently displayed image to the new cumulated display surface obtained following the detected shift of the screens.

Thus, as and when the user enlarges the cumulated display surface, the display image is magnified at the same time since the computer 12 sees to it that this image permanently occupies the totality of the available cumulated display surface. The user thus has a new method available to magnify an image without having to zoom in on a detail or a portion of this complete image.

The computer 12 also displays the complete image on the cumulated display surface whatever the position of the screen.

Many other embodiments are possible. In particular, many other embodiments of the mechanism for shifting screens are possible. For example, this shift mechanism does not necessarily incorporate slide-rails or sliders.

The shift mechanism can be designed so the shifts along the directions X and Y are independent of each other. For example, to this end, the end of the slide-rail 36 is fixed to the frame of the display unit 2 by means of a first pivot link whose rotational axis is parallel to the direction Z. For example, this axis of rotation passes through the attachment point 45 illustrated in FIG. 2. The slider 38 is then fixed to the screen 10 and to the synchronization mechanism 50 by second pivot links whose rotational axes are also parallel to the direction Z.

Similarly, other mechanisms for locking the position of the screens are possible. For example, the locking of the position of the screens can be obtained by means of a stud or a lock-screw. It is not necessary for the locking mechanism to be capable of locking intermediate positions between the retracted position and the fully deployed position; however, this is preferable.

Many flat screens can be used. For example, electrophoretic screens are used instead of OLED screens. These electrophoretic screens may be based on a mixture of black-and-white beads wedged between an upper transparent layer and a lower layer. The black beads have polarity, for example a positive polarity, and the white beads have polarity, for example negative polarity. Electrodes are positioned beneath the lower layer. When the electrode is activated, it will for example draw the positive polarity beads and push away the negative polarity beads. This therefore concentrates the black beads in the vicinity of the inner layer and the white beads in the vicinity of the upper layer. It is therefore possible through this method to adjust the color of a black and white pixel and therefore reveal images. These electrophoretic screens are bistable and therefore maintain the display of an image without consuming electrical power.

LCD (Liquid Crystal Display) screens can be used if necessary.

The screens used may also be touch-screens.

To make the display unit, it is not necessary for all the screens to have the same size. Screens of different sizes may be used. Nor is it necessary for each of these screens to have a different individual rectangular display surface as represented here. For example, the display surfaces may be diamond-shaped, triangular or may have other shapes with acute or obtuse angles.

The screens may be capable of being shifted along only one direction or, on the contrary, along several non-colinear directions. Furthermore, a same screen may be movable along several different directions depending for example on whether it is drawn along a direction or another.

This method for synchronizing shifts of the screens may be omitted.

The number of screens may vary. It must be at least two but may also be greater than four and for example greater than or equal to nine.

The shifting of the screens relative to one another may be motor-driven. In this case, the mechanism for synchronizing the shifting of the screens may be obtained by an appropriate command for shifting the screens by means of actuators.

The sensor 16 may be omitted. In this case, a module for manually adjusting the size of an image is provided in the display unit 2.

As a variant, the content of the complete image displayed is also modified as a function of the position of the screens measured by the sensor. For example, in the retracted position, the image is constituted solely by an initial illustration which occupies the totality of the cumulated display surface. In the fully deployed position, the complete image displayed comprises the same initial illustration supplemented by complementary illustrations. For example, the complementary illustrations are positioned in the supplementary part of the cumulated display surface which appears following the shift to the fully deployed position. Preferably, the dimensions of the initial illustration on the cumulated display surface are the same in the retracted and fully deployed positions. Thus, a shift of a screen to its fully deployed position provides access to the complementary illustrations. This can be applied to the consultation of a map of a town center and its suburbs. The initial illustration is the map of the town center only. The complementary illustrations are maps of the suburbs. In this application, by shifting the screen from its retracted position to its fully deployed position, the user accesses more information, i.e. the maps of the suburbs.

Another way of modifying the complete image displayed as a function of the position of the screens is to stretch the initial illustration in the direction or directions of shift of the screens so that, whatever the positions of the screens, this illustration occupies more than 90% of the cumulated display surface.

The display unit 2 may be used in mobile terminals such as mobile telephones or laptop computers. The display unit 2 can also be implemented to obtain fixed terminals such as a television set.

The invention claimed is:

1. A display unit comprising:
several screens positioned in parallel to a same plane of display so as to form a cumulated surface of display of an image equal to the accumulated total of the individual display surfaces of each screen minus overlapping surfaces, if any, between the individual display surfaces,
a mechanism for shifting the screens in parallel to the plane of display between a retracted position in, which at least two screens overlap to reduce the cumulated display surface, and a fully deployed position, in which the overlapping of the screens is reduced or eliminated to increase the cumulated display surface, and
a computer capable of commanding the display of image portions on respective screens so as to display the complete image on the totality of the cumulated display surface, both in the retracted position and in the fully deployed position.

2. The display unit according to claim 1, further comprising at least one sensor capable of measuring the position of the screens, and wherein the computer is capable of automatically adapting the display of the image to the measured position of the screens.

3. The display unit according to claim 1, wherein the computer is capable of commanding the display of the same complete image on the totality of the cumulated display surface both in the retracted position and in the fully deployed position.

4. The display unit according to claim 1, wherein the display unit comprises at least three screens that can be shifted relative to one another and a synchronization mechanism capable of imposing a correlation between the shifts of these screens.

5. The display unit according to claim 1, further comprising a mechanism for locking the position of the screens in at least one intermediate position between the retracted position and the fully deployed position.

6. A method for displaying an image, the method comprising:
providing a display unit having:
several screens positioned in parallel to a same plane of display so as to form a cumulated surface of display of an image equal to the accumulated total of the individual display surfaces of each screen minus overlapping surfaces, if any, between the individual display surfaces, and
a computer capable of commanding the display of image portions on respective screens so as to display the complete image on the totality of the cumulated display surface,
shifting the screens in parallel to the plane of display between a retracted position in which at least two screens overlap to reduce the cumulated display surface and a fully deployed position in which the overlapping of the screens is reduced or eliminated to increase the cumulated display surface, and
commanding a display of a complete image on the totality of the cumulated display surface both in the retracted position and in the fully deployed position.

7. The method according to claim 6, further comprising:
measuring of the position of the screens,
detecting of a shifting of the screens from the measured position of the screens, and
in response, automatically activating a new command for displaying each image portion.

8. The method according to claim 6, further comprising commanding the display of the same complete image on the totality of the cumulated display surface both in the retracted position and in the fully deployed position.

9. An information-recording medium having encoded thereon computer-executable instructions for commanding a display of a complete image on the totality of a cumulated display surface, alternately, in a retracted position and in a fully deployed position of a display unit having:
several screens positioned in parallel to a same plane of display so as to form a cumulated surface of display of an image equal to the accumulated total of the individual display surfaces of each screen minus overlapping surfaces, if any, between the individual display surfaces, an electronic computer capable of commanding the display of image portions on respective screens so as to display the complete image on the totality of the cumulated display surface, and a mechanism for shifting the screens in parallel to the plane of display between the retracted position, in which at least two screens overlap to reduce the cumulated display surface, and the fully deployed position, in which the overlapping of the screens is reduced or eliminated to increase the cumulated display surface, wherein the instructions are executed by the electronic computer.

* * * * *